US006906494B2

(12) United States Patent
Matsuura et al.

(10) Patent No.: US 6,906,494 B2
(45) Date of Patent: Jun. 14, 2005

(54) MOTOR CONTROLLER

(75) Inventors: Sadahiro Matsuura, Ibaraki (JP); Yasushi Kato, Soraku-gun (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/495,690

(22) PCT Filed: Oct. 15, 2002

(86) PCT No.: PCT/JP02/10645

§ 371 (c)(1),
(2), (4) Date: May 14, 2004

(87) PCT Pub. No.: WO03/043173

PCT Pub. Date: May 22, 2003

(65) Prior Publication Data

US 2005/0001584 A1 Jan. 6, 2005

(30) Foreign Application Priority Data

Nov. 16, 2001 (JP) ........................................ 2001-351452

(51) Int. Cl.[7] ................................................. H02P 5/28
(52) U.S. Cl. .................... 318/811; 318/798; 318/799
(58) Field of Search ........................... 318/811, 798, 318/799, 700–724

(56) References Cited

U.S. PATENT DOCUMENTS

| | | | |
|---|---|---|---|
| 4,028,598 A | | 6/1977 | Bergmans |
| 4,658,190 A | | 4/1987 | Miyazaki et al. |
| 4,967,135 A | * | 10/1990 | Ashikaga et al. ............ 318/808 |
| 5,038,092 A | * | 8/1991 | Asano et al. ................ 318/811 |
| 5,196,771 A | * | 3/1993 | Naito ........................... 318/254 |
| 5,352,962 A | | 10/1994 | Galburt |
| 5,789,891 A | * | 8/1998 | Nakane ........................ 318/626 |
| 5,847,592 A | | 12/1998 | Gleim et al. |
| 5,932,984 A | * | 8/1999 | Murakami et al. .......... 318/560 |
| 5,942,863 A | * | 8/1999 | Wada ........................... 318/254 |
| 5,969,489 A | | 10/1999 | Itou et al. |
| 5,969,490 A | | 10/1999 | Gotou |
| 6,013,999 A | * | 1/2000 | Howard et al. ............. 318/685 |
| 6,025,691 A | * | 2/2000 | Kawabata et al. .......... 318/700 |
| 6,052,636 A | * | 4/2000 | Lombardi ..................... 701/50 |
| 6,154,002 A | * | 11/2000 | Izumisawa et al. ......... 318/721 |
| 6,184,648 B1 | * | 2/2001 | Kato et al. ................... 318/811 |
| 6,297,574 B1 | * | 10/2001 | Schob et al. ............... 310/90.5 |
| 6,313,601 B1 | * | 11/2001 | Kubo et al. ................. 318/799 |
| 6,362,586 B1 | * | 3/2002 | Naidu ......................... 318/432 |
| 6,407,531 B1 | * | 6/2002 | Walters et al. ............. 318/805 |
| 6,445,154 B1 | * | 9/2002 | Toyozawa et al. .......... 318/700 |
| 6,541,937 B2 | * | 4/2003 | Kato ............................. 318/727 |
| 6,541,939 B2 | * | 4/2003 | Kishibe et al. .............. 318/799 |
| 6,593,714 B2 | * | 7/2003 | Nagayama .................. 318/254 |
| 6,674,258 B2 | * | 1/2004 | Sakai et al. ................. 318/439 |
| 6,693,422 B2 | * | 2/2004 | Lutz ......................... 324/207.2 |
| 6,774,599 B2 | * | 8/2004 | Ishii ............................. 318/652 |
| 2004/0061461 A1 | * | 4/2004 | Tajima et al. ............... 318/254 |

FOREIGN PATENT DOCUMENTS

| | | |
|---|---|---|
| EP | 0 940 917 | 9/1999 |
| EP | 1 085 650 | 3/2001 |
| GB | 2 070 354 | 9/1981 |
| JP | 57-145559 | 9/1982 |
| JP | 59-58314 | 4/1984 |
| JP | 3-49071 | 3/1991 |
| JP | 8-182377 | 7/1996 |
| JP | 10-201284 | 7/1998 |

OTHER PUBLICATIONS

International Search Report corresponding to application No. PCT/JP02/10645 dated May 20, 2003.

* cited by examiner

*Primary Examiner*—David Martin
*Assistant Examiner*—Patrick Miller
(74) *Attorney, Agent, or Firm*—RatnerPrestia

(57) ABSTRACT

A motor is equipped with a magnetic-flux detector, which detects magnetic fluxes from magnets of the motor. A position signal converter finds a position of the motor using a value detected by magnetic-flux detector. A speed controller throws the motor in sine wave drive using the detected motor position.

16 Claims, 11 Drawing Sheets

MOTOR CONTROLLER

This Application is a U.S. National Phase Application of PCT International Application PCT/JP02/10645 Oct. 15, 2002.

TECHNICAL FIELD

The present invention relates to a motor controller that drives a synchronous motor having magnets. The synchronous motor includes a magnetic flux detector for detecting a motor position. The motor controller of the present invention throws the synchronous motor in sine wave drive even at starting or transition.

BACKGROUND ART

A conventional motor controller is described hereinafter with reference to FIG. 17 and FIG. 18. Driving a synchronous motor involves (a) detecting a position of magnetic pole of the motor, and (b) controlling a current or a voltage applied to windings of the motor responding to a magnetic pole signal (CS signal) indicating the position of magnetic pole of the motor.

FIG. 17 shows rectangular wave drive of a three-phase motor. Based on a logic of magnetic-pole signals CS1, CS2, and CS3 of the three-phase, a rectangular wave drive of 120 degrees is applied to phases U, V and W of the motor. Power is usually supplied during this 120 degrees period. FIG. 18 shows a sine wave drive of the three-phase motor. A sine wave drive applied to the phases U, V and W of the motor using (a) a change point of the CS signals' logic and (b) a positional information from the change point produced by a position detector of high resolution, such as an encoder, separately mounted. In this sine-wave drive, power is supplied during 180 degrees period.

The sine wave drive is desirable because it can drive a motor efficiently with less vibrations. However, as described above, CS signals simply throw a motor in rectangular wave drive, thus a motor controller needs a positional detector such as an encoder for obtaining positional information in order to throw the motor in sine wave drive. The positional detector should be mounted separately, which is unfavorable to the motor controller in view of the cost and size. Even a motor controller including an encoder is obliged to drive the motor with a rectangular wave at initial starting because an absolute position cannot be detected during a period from the starting to a first change of a CS signal. In this period, the motor cannot be driven with a sine wave, and the rectangular wave drive is only a choice.

Japanese Patent Application Non-examined Publication No. H10-201284 discloses that a constant speed drive of a motor allows sine wave drive by dividing intervals between change points of the logic of the CS signal. The intervals are measured by a timer, and the intervals are divided by the measured values. However, this method cannot deal with a great change in a motor speed or a transient period, so that the sine wave cannot be kept going.

SUMMARY OF THE INVENTION

The present invention addresses the problem discussed above, and aims to provide a motor controller that comprises the following elements:
 (a) a motor;
 (b) magnetic flux detecting means for detecting a magnetic flux of the motor directly or indirectly;
 (c) a position detecting means for converting an amount of the detected magnetic flux to a position of the motor; and
 (d) control means for driving the motor with a sine wave using a detected position by the position detecting means.

PREFERRED EMBODIMENT OF THE PRESENT INVENTION

Exemplary embodiments of the present invention are demonstrated hereinafter with reference to the accompanying drawings.

Exemplary Embodiment 1

Figure 1:
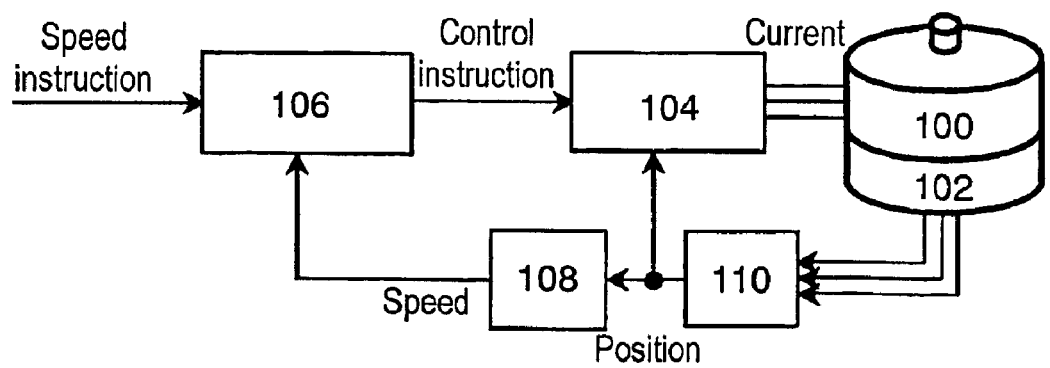
FIG. 1 shows a structure of a motor controller in accordance with a first exemplary embodiment of the present invention.

FIG. 1 shows a structure of a motor controller in accordance with the first exemplary embodiment of the present invention. Three-phase synchronous motor 100 is equipped with magnetic-flux detector 102, which detects magnetic flux of motor's magnets and outputs three-phase sinusoidal wave magnetic-pole signals CS1, CS2 and CS3 having phase differences of approx. 120 degrees in between respectively. Magnetic-flux detector 102 is fixed to a stator winding of the motor such that the magnetic-pole signals become in phase with a line-to-line induction voltage of motor 100.

Figure 2:
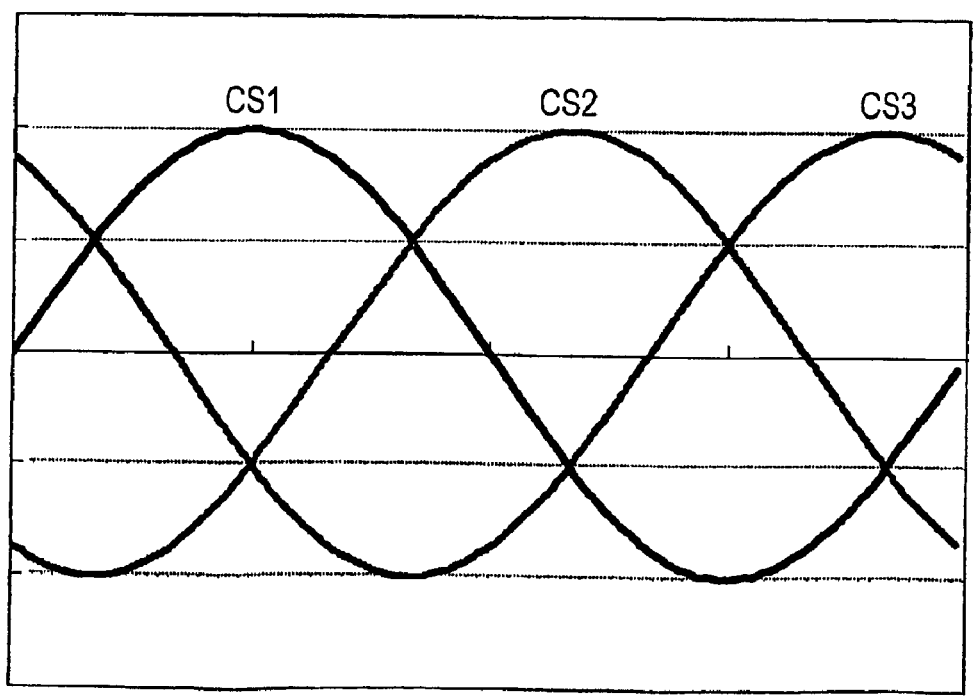
FIG. 2 shows an example of magnetic pole signals.

Magnetic-pole signals CS1, CS2 and CS3 are fed into position signal converter 110 in order to find a position of the motor. Converter 110 converts analog values of the magnetic-pole signals into digital values, and performs inverse trigonometric function computation, thereby finding a position of the motor. The inverse trigonometric function computation can be performed using any one of the magnetic-pole signals CS1, CS2 and CS3; however, as shown in FIG. 2, a use of an area less than a half of the amplitude, where respective signals cross each other, results in a more accurate computation. To be more specific, perform a computation by switching the magnetic-pole signals at a threshold value half of an amplitude, then converting into a position of one cycle of the magnetic-pole signal using a sign of the magnetic-pole signal. This method advantageously reduces an amount of tables used in the inverse trigonometric function computation.

Figure 3:
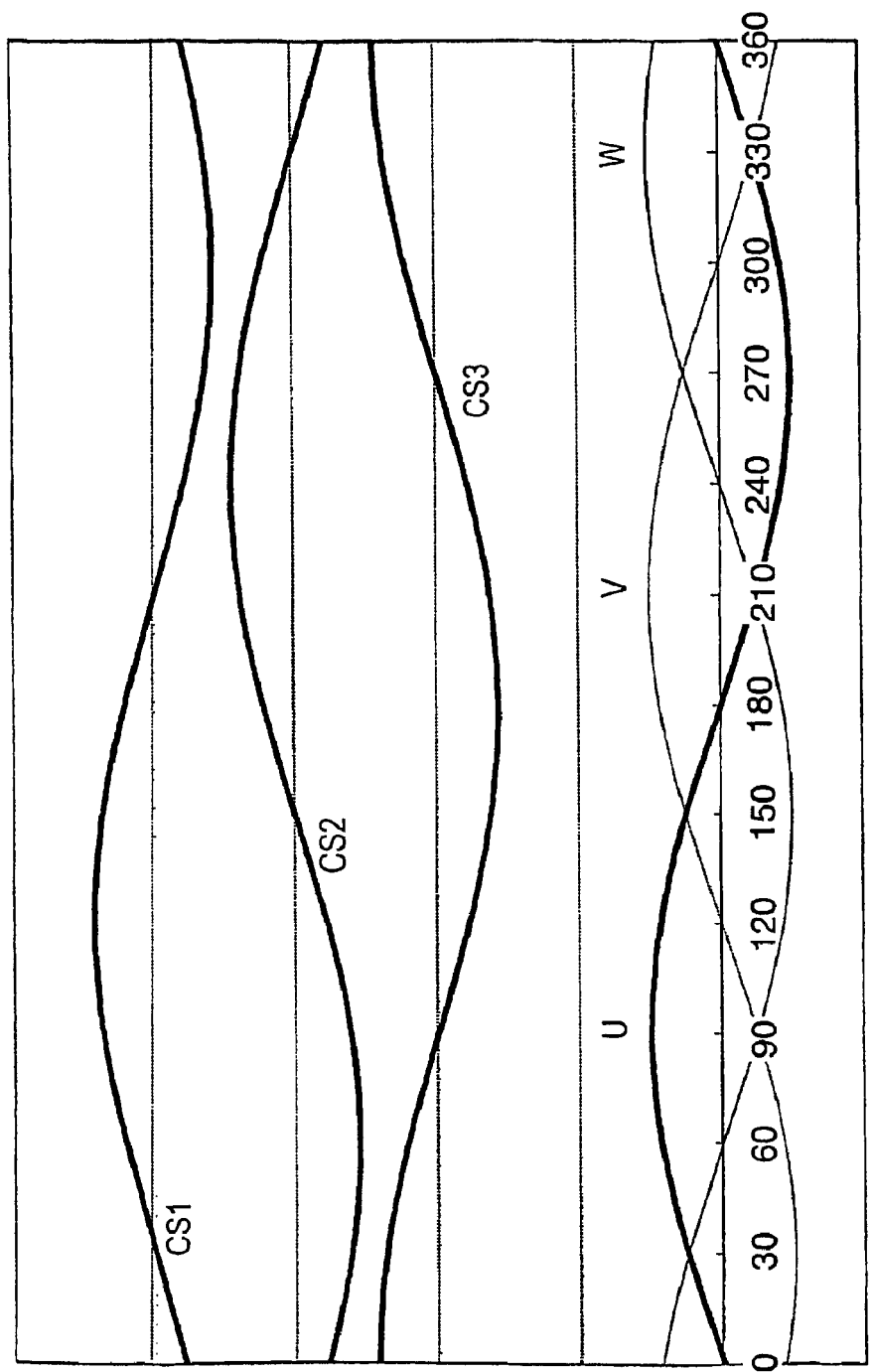
FIG. 3 shows an example of magnetic pole signals and motor driving wave forms.

Positional information from position signal converter 110 allows to provide the three phases (phases U, V and W) with sine wave drive as shown in FIG. 3. The magnetic-pole signals, as already discussed, are in phase with line-to-line induction voltages. Thus the phases of phases U, V and W are shifted from those of the magnetic-pole signals by 30 degrees as illustrated so that the current waveforms of phases U, V and W can be in proper phaseal relation with those of the induction voltages of the respective phases. In the case of a voltage drive, a phase of the voltage is advanced responsive to a speed or a load of the motor so that the phases of the currents can be in proper phaseal relation with the voltage.

Differentiator 108 converts positional information into a motor speed. Speed controller 106 outputs an instruction to PWM pulse width modulation) controller 104 so that the motor speed can follow an instructed speed. Not only the speed control described here, but also position control or torque control is available. PWM controller 104 throws motor 100 in PWM drive following the control instruction. It is not necessarily the PWM drive, but linear drive by a power operation amplifier can be available.

The foregoing structure allows the magnetic-flux detector to detect an analog amount of magnetic flux, so that the magnetic-pole position can be monitored from a turn-on which starts driving the motor. As a result, a motor can be driven with a sine wave from an initial turn-on. When a speed of the motor changes a lot, e.g., a transient response period, the motor can be kept driving with the sine waveform without adding a position detector such as an encoder.

Figure 4:
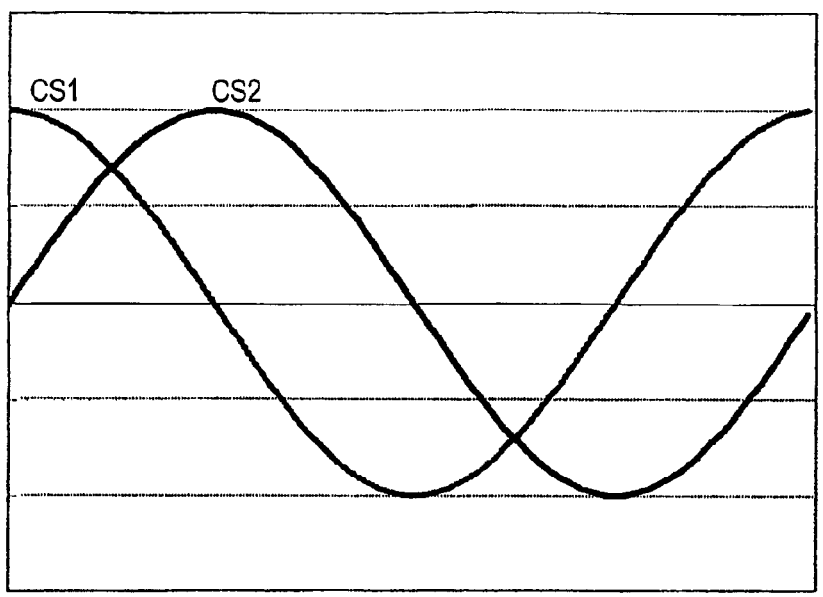
FIG. 4 shows another example of magnetic pole signals.

In this embodiment, a three-phase synchronous rotary motor is demonstrated, however, other motors including a two-phase motor, a stepping motor, or a liner motor can be driven with a sine wave. As this embodiment proves, a number of phases of the motor does not always agree with a number of the magnetic flux detectors. For instance, as shown in FIG. 4, a two-phase magnetic flux detector can be used. This detector outputs sine waves having a phase difference of 90 degrees. In the case of two-phase, the inverse trigonometric function computation can be performed with one of signals CS1 or CS2; however a use of an area, a product of the square root of 0.5 multiplied by an amplitude where respective magnetic-pole signals cross each other, results in a more accurate computation. In other words, a product of multiplying an amplitude by the square root of 0.5 is used as a threshold value at which the magnetic-pole signals are switched for calculation.

The magnetic flux detector does not always directly detect a magnetic flux of a motor, but it can detect a magnetic flux indirectly. In other words, a magnetic-flux detector including a sensor magnet and an MR sensor can be used. This detector outputs a sine wave having the same cycle as the motor's magnetic flux.

Exemplary Embodiment 2

A motor controller in accordance with the second embodiment can correct influence of a tertiary harmonic component applied to three-phase magnetic-pole signals CS1, CS2 and CS3, or influence by off-sets in the respective signals.

Figure 5:
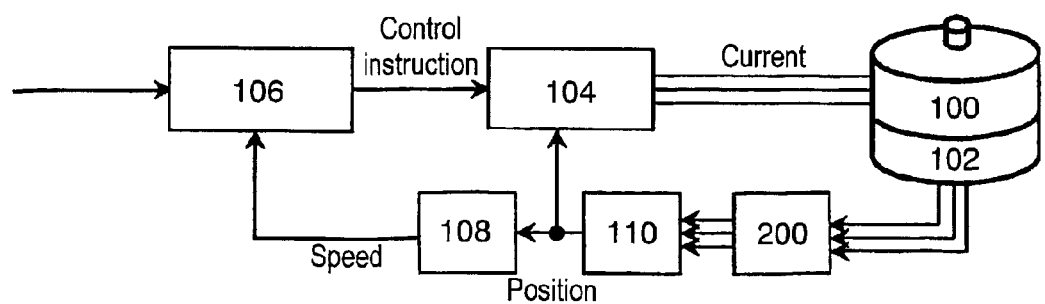
FIG. 5 shows a structure of a motor controller in accordance with a second exemplary embodiment of the present invention.
Figure 6:
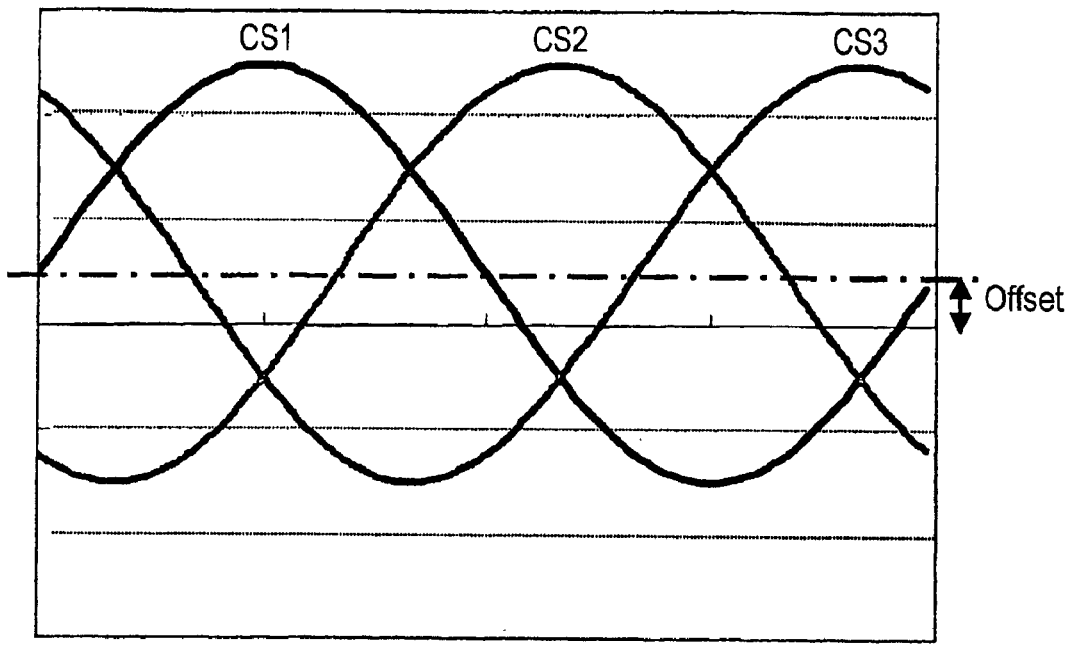
FIG. 6 shows an example of magnetic pole signals.
Figure 7:
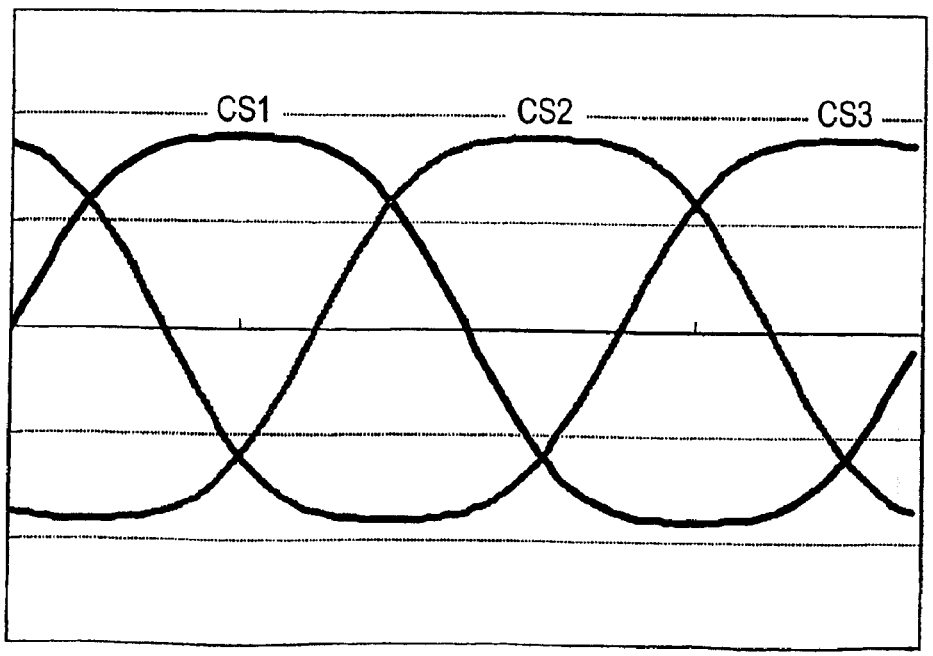
FIG. 7 shows another example of magnetic pole signals.

FIG. 5 shows a structure of the motor controller in accordance with the second embodiment of the present invention. Motor 100 is equipped with magnetic-flux detector 102, which detects magnetic flux of motor's magnets and outputs three-phase sinusoidal wave magnetic-pole signals CS1, CS2 and CS3 having phase differences of approx. 120 degrees in between respectively. However, actual waveforms of the magnetic-pole signals often include offsets similar to each other in three phases respectively as shown in FIG. 6, or actual waveforms of the signals are often distorted as shown in FIG. 7 because of tertiary harmonic components included in the signals. The magnetic-pole signals are corrected by neutral-point corrector 200 in the following way:

Ideal forms of magnetic-pole signals CS1, CS2 and CS3 are expressed CS1r, CS2r and CS3r using angle θ and amplitude "A" of each one of the signals as follows:

$$CS1r = A \cdot \sin(\theta) \quad \text{(formula 1)}$$

$$CS2r = A \cdot \sin(\theta - 2\pi/3) \quad \text{(formula 2)}$$

$$CS3r = A \cdot \sin(\theta + 2\pi/3) \quad \text{(formula 3)}$$

The total sum of the three signals is 0 (zero).

$$CS1r + CSr2 + CSr3 = 0 \quad \text{(formula 4)}$$

On the other hand, actual magnetic-pole signals CS1, CS2 and CS3 including offsets or amplitude "B" of tertiary harmonic components are expressed in the following equations.

$$CS1 = A \cdot \sin(\theta) + B \cdot \sin(3 \cdot \theta) + \text{offset} \quad \text{(formula 5)}$$

$$CS2 = A \cdot \sin(\theta - 2\pi/3) + B \cdot \sin\{3 \cdot (\theta - 2\pi/3)\} + \text{offset} \quad \text{(formula 6)}$$

$$CS3 = A \cdot \sin(\theta + 2\pi/3) + B \cdot \sin\{3 \cdot (\theta + 2\pi/3)\} + \text{offset} \quad \text{(formula 7)}$$

The signals average out:

$$CSave = (CS1 + CS2 + CS3)/3 = B \cdot \sin(3 \cdot \theta) + \text{offset} \quad \text{(formula 8)}$$

The subtraction of this CSave from the actual magnetic-pole signals can correct the actual signals to be ideal forms CS1r, CS2r and CS3r where the offsets or the tertiary harmonic components are removed. Neutral point corrector 200 outputs the ideal forms of magnetic-pole signals thus corrected. The corrected magnetic-pole signals can be also found directly from the following equations instead of using the CSave:

$$CS1r = (2 \cdot CS1 - CS2 - CS3)/3 \quad \text{(formula 9)}$$

$$CS2r = (2 \cdot CS2 - CS3 - CS1)/3 \quad \text{(formula 10)}$$

$$CS3r = (2 \cdot CS3 - CS1 - CS2)/3 \quad \text{(formula 11)}$$

Position signal converter 110 finds a position of the motor through inverse trigonometric function computation in the same manner as the first embodiment based on the corrected magnetic-pole signals supplied from neutral-point corrector 200, then outputs positional information. Based on this positional information, sine-wave drive and speed control are provided to the motor using differentiator 108, speed controller 106 and PWM controller 104.

The foregoing structure allows the motor controller to correct three-phase magnetic-pole signals detected by the magnetic-flux detector with ease even the signals include offsets or tertiary harmonic components which distort the waveforms of the signals. As a result, the motor can be driven with a sine wave from an initial turn-on. When a speed of the motor changes a lot, e.g., a transient response period, the motor can be kept driving with the sine wave without adding a position detector such as an encoder at an inexpensive cost and with ease. This embodiment proves that the signals including both of the offsets and the harmonic components can be corrected with ease.

Exemplary Embodiment 3

A motor controller in accordance with the third embodiment can suppress influence of the shift of magnetic-pole signals from an ideal sine wave, e.g., one of the signals includes an offset or a high-order harmonic component, or each one of phase differences between three-phase magnetic-pole signals is shifted from 120 degrees. The motor controller thus can assure monotonic increase of the detected positional values.

Figure 8:
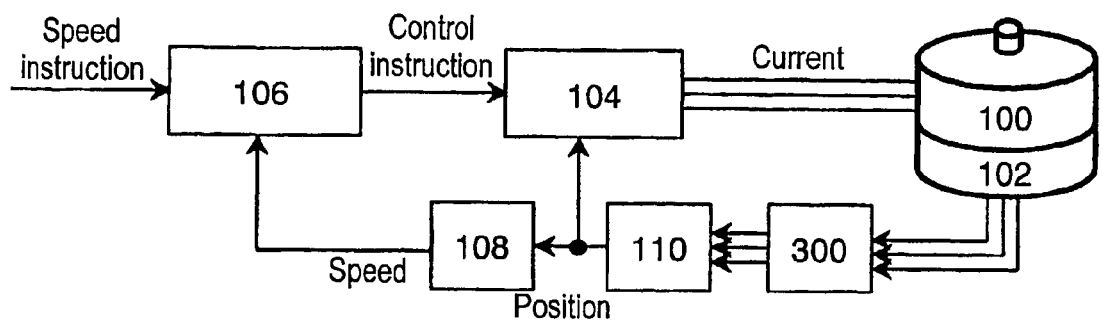
FIG. 8 shows a structure of a motor controller in accordance with a third exemplary embodiment of the present invention.
Figure 9:
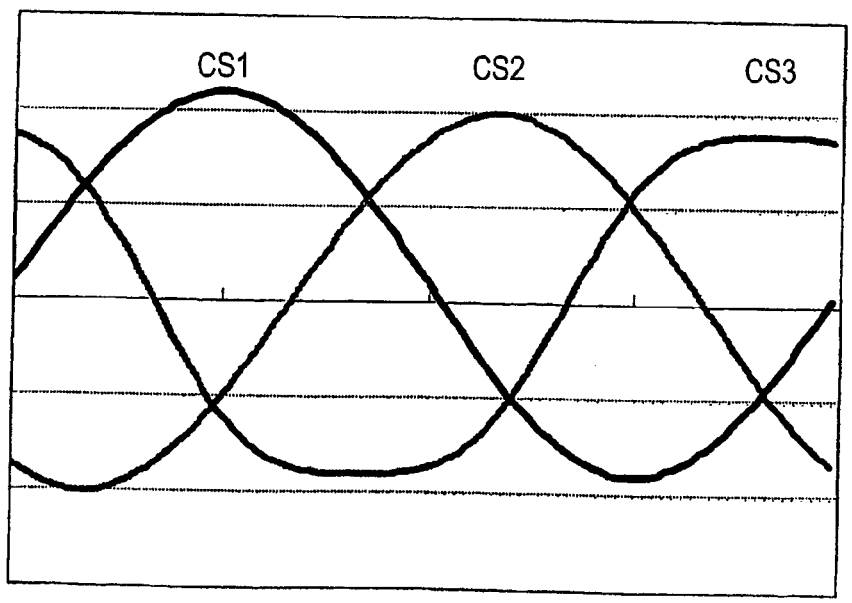
FIG. 9 shows an example of magnetic pole signals.

FIG. 8 shows a structure of the motor controller in accordance with the third embodiment of the present invention. Motor 100 is equipped with magnetic-flux detector 102, which detects magnetic flux of motor's magnets and outputs three-phase sinusoidal wave magnetic-pole signals CS1, CS2 and CS3 having phase differences of approx. 120 degrees in between respectively. Actual waveforms of the signals include offsets or harmonic components, or respective amplitudes differ from each other as shown in FIG. 9. Magnetic-flux mapping device 300 correct influence by the distortion of the magnetic-pole signals in the following way:

The sum (CSgain) of the respective squares of ideal signals CS1r, CS2r and CS3r equals to the product of multiplying the square of amplitude A by 1.5 as expressed in the following equation:

$$CSgain = CS1r^2 + CS2r^2 + CS3r^2 = 1.5 \times A^2 \quad \text{(formula 12)}$$

On the other hand, actual magnetic-pole signals CS1, CS2 and CS3 are expressed in the following equations due to changes in amplitude A, offsets, harmonic components and phase θ.

$$CS1 = A1 \cdot \sin(\theta + \theta 1) + \text{offset 1} \quad \text{(formula 13)}$$

$$CS2 = A2 \cdot \sin(\theta + \theta 2 - 2\pi/3) + \text{offset 2} \quad \text{(formula 14)}$$

$$CS3 = A3 \cdot \sin(\theta + \theta 3 + 2\pi/3) + \text{offset 3} \quad \text{(formula 15)}$$

Figure 10:
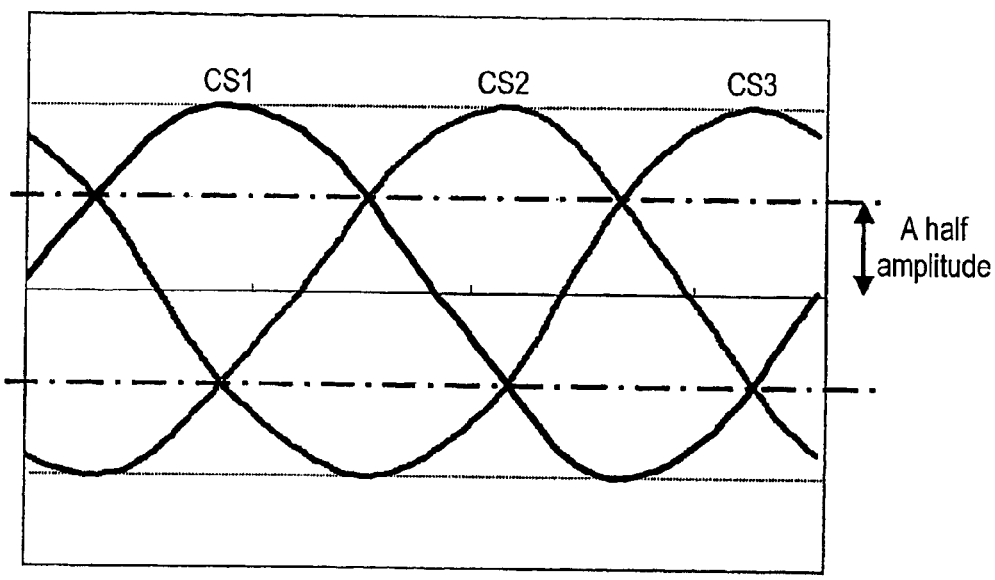
FIG. 10 shows an example of magnetic pole signals corrected by a magnetic-flux mapping device.

Each one of three magnetic-pole signals is divided by a square root of CSgain (sum of squares of respective three magnetic-pole signals), thereby correcting the three signals to have a constant amplitude in their three phases as shown in FIG. 10. In other words, magnetic flux mapping device 300 calculates sum of squares of respective three magnetic-pole signals, and divides each one of three magnetic-pole signals by the square root thereof. As a result, device 300 maps the sum of squares of respective three magnetic-pole signals to be constant, and corrects influence by the distortion of the original signals. An amplitude after the correction is not necessary to fit that of the original signal, and can be set at any value.

Based on the corrected signals supplied from mapping device 300, position signal converter 110 finds a position of the motor through inverse trigonometric function computation and outputs positional information. The inverse trigonometric function computation can be performed with one of signals CS1, CS2 and CS3, however, a use of an area under half of an amplitude, where corrected magnetic-pole signals cross each other, results in a more accurate computation. To be more specific, a computation by switching the magnetic-pole signals at a threshold value half of an amplitude, and converting into a position of one cycle of the magnetic-pole signal using a sign of the magnetic-pole signal is performed.

In the case of using of an area under half of an amplitude where corrected magnetic-pole signals cross each other, neutral-point corrector 200, which is described in the second embodiment, can be disposed between magnetic-flux detector 102 and magnetic flux mapping device 300. Even a computation by switching the magnetic-pole signals at a threshold value half of an amplitude is performed, the motor controller can assure monotonic increase by correcting influence of the distortion of the signals. This method advantageously reduces an amount of tables used in the inverse trigonometric function computation.

Figure 11:
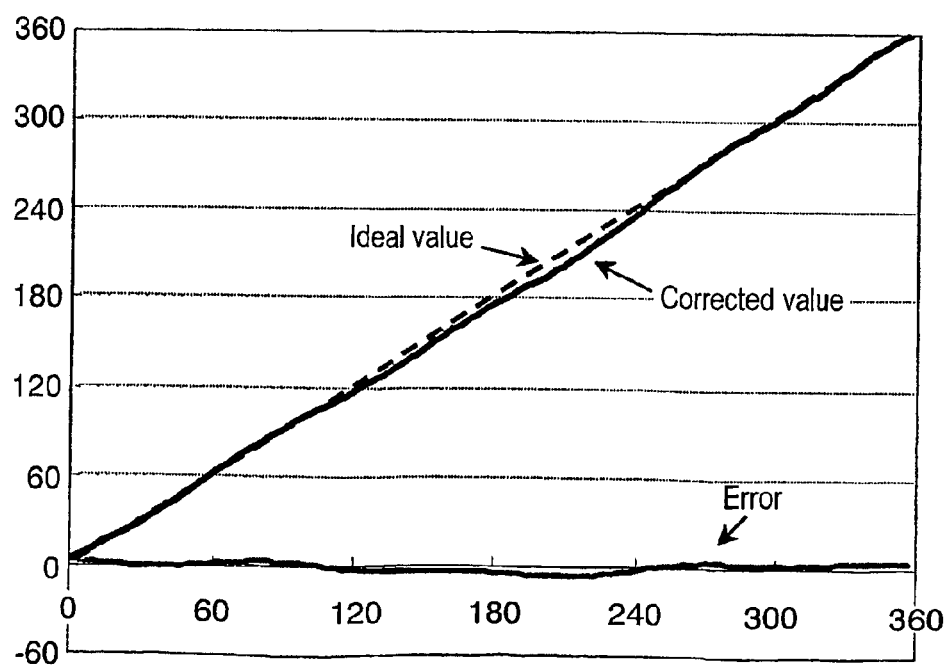
FIG. 11 shows an example of an error of positional information supplied from a position signal converter.

This is a similar operation to the first embodiment. FIG. 10 shows the signals mapped by mapping device 300, and FIG. 11 shows the positional information converted from the signals shown in FIG. 10. As such, even if an original signal includes distortion, influence due to the distortion can be suppressed, so that positional information with a smaller error is obtainable. Based on this positional information, sine-wave drive and speed control are provided to the motor using differentiator 108, speed controller 106 and PWM controller 104.

The foregoing structure allows the motor controller to correct three-phase magnetic-pole signals detected by the magnetic-flux detector with ease. The motor controller thus can assure monotonic increase of the detected positional values. As a result, the motor can be driven with a sine wave from an initial turn-on. When a speed of the motor changes a lot, e.g., a transient response period, the motor can be kept driving with the sine wave without adding a position detector such as an encoder at an inexpensive cost and with ease. In this third embodiment, the magnetic-pole signal is divided by the square root of the sum of squares of the three-phase magnetic-pole signals, thereby finding a place of the motor; however, the square of a magnetic-pole signal can be divided by the sum of the squares of the three-phase magnetic-pole signals, so that the motor position is found.

Exemplary Embodiment 4

A motor controller in accordance with the fourth embodiment detects magnetic-pole signals of only any two phases out of three-phase magnetic-pole signals for throwing the motor in sine wave drive.

Figure 12:
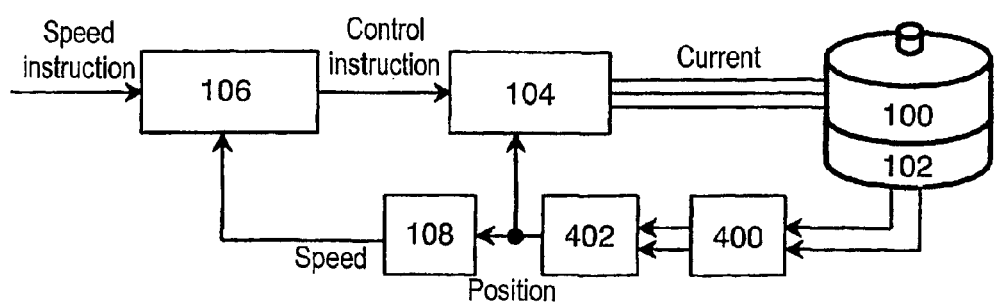
FIG. 12 shows a structure of a motor controller in accordance with a fourth exemplary embodiment of the present invention.

FIG. 12 shows a structure of the motor controller in accordance with the fourth embodiment of the present invention. Motor 100 is equipped with magnetic-flux detector 102, which detects magnetic flux of motor's magnets and outputs any two signals out of three-phase magnetic-pole signals CS1, CS2 and CS3. Sinusoidal wave magnetic-pole signals CS1, CS2 and CS3 having phase differences of approx. 120 degrees in between respectively; however, they are converted by the following three-phase/two-phase conversion into two-phase signals CSa and CSb having a phase difference of 90 degrees in sinusoidal waves.

$$\begin{pmatrix} CSa \\ CSb \end{pmatrix} = K \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} CS1 \\ CS2 \\ CS3 \end{pmatrix} \quad \text{(formula 16)}$$

where K=an any constant.

As already discussed in the second embodiment, the total sum of signals CS1, CS2 and CS3 is 0 (zero). Thus detection of any two signals in the above equation allows the three-phase/two-phase conversion. Two-phase converter 400 takes any two signals in analog values out of three-phase magnetic-phase signals into an A/D converter, and converts them to two-phase magnetic-pole sinusoidal wave signals CSa and CSb having a phase difference of 90 degrees.

If the signals CS1, CS2 and CS3 shift largely from ideal sine waves, the foregoing equation can be modified to the following equation, so that the sum and the difference of two magnetic-pole signals can be used. This method can disperse the influence of the shift.

$$\begin{pmatrix} CSa \\ CSb \end{pmatrix} = K \begin{pmatrix} -\frac{3}{2} & -\frac{3}{2} \\ \frac{\sqrt{3}}{2} & -\frac{\sqrt{3}}{2} \end{pmatrix} \begin{pmatrix} CS2 \\ CS3 \end{pmatrix}$$ (formula 17)

Based on signals CSa and CSb converted by converter 400, position signal converter 402 finds a position of the motor through inverse trigonometric function computation, and outputs positional information. The inverse trigonometric function computation is used in either one of signal CSa or signal CSb. However, it can be used in an area less than the product of multiplying the amplitude, where the respective signals cross each other, by the square root of 0.5. This method results in a more accurate computation. To be more specific, a product of multiplying an amplitude by the square root of 0.5 is used as a threshold value at which the converted magnetic-pole signals are switched for calculation, and signs of the converted signals CSa and CSb are used for conversion into a position of one cycle of the magnetic-pole signals. This method reduces an amount of tables used in the computations. Based on the positional information supplied from position signal converter 402, sine-wave drive and speed control are provided to the motor using differentiator 108, speed controller 106 and PWM controller 104. This is similar to the first exemplary embodiment.

The foregoing structure allows the motor controller to detect a position of the motor with any two magnetic-pole signals detected out of three-phase magnetic-pole signals. As a result, the motor can be driven with a sine wave from an initial turn-on. When a speed of the motor changes a lot, e.g., a transient response period, the motor can be kept driving with the sine wave without adding a position detector such as an encoder at an inexpensive cost and with ease.

Exemplary Embodiment 5

A motor controller in accordance with the fifth embodiment of the present invention allows to throw the motor in sine wave drive by detecting any two-phase magnetic-pole signals out of three-phase magnetic-pole signals. This is similar to the fourth embodiment. Further, the fifth embodiment assures monotonic increase of the detected positional values by suppressing the influence due to the shift of the three-phase signals from ideal sine waves.

Figure 13:
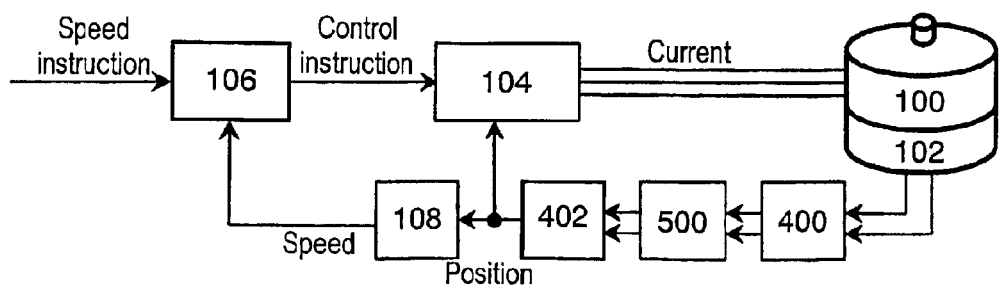
FIG. 13 shows a structure of a motor controller in accordance with a fifth exemplary embodiment of the present invention.

FIG. 13 shows a structure of the motor controller in accordance with the fifth embodiment of the present invention. Motor 100 is equipped with magnetic-flux detector 102, which detects magnetic flux of motor's magnets and outputs three-phase sinusoidal wave magnetic-pole signals CS1, CS2 and CS3 having phase differences of approx. 120 degrees in between respectively. Actual waveforms of the signals include offsets or harmonic components as same as the third embodiment, and are thus distorted as shown in FIG. 9.

Two-phase converter 400 converts any two signals out of the three-phase magnetic-pole signals CS1, CS2 and CS3 into two-phase sinusoidal wave signals CSa and CSb having a phase difference of 90 degrees. This is similar to the fourth embodiment. The distortions of the three-phase signals cause distortions in the waveforms of signals CSa and CSb. Magnetic-flux mapping device 500 corrects the influence of the distortions in the following way:

Ideal forms of two-phase signal are expressed in the following equations using angle $\theta$ and amplitude A of a magnetic-pole signal:

$$CSar = A \cdot \cos(\theta)$$ (formula 18)

$$CSbr = A \cdot \sin(\theta)$$ (formula 19)

The sum of squares of these two signals is the square of amplitude "A" as showed in the equation below:

$$CSgain = CSar^2 + CSbr^2 = A^2$$ (formula 20)

Figure 14:
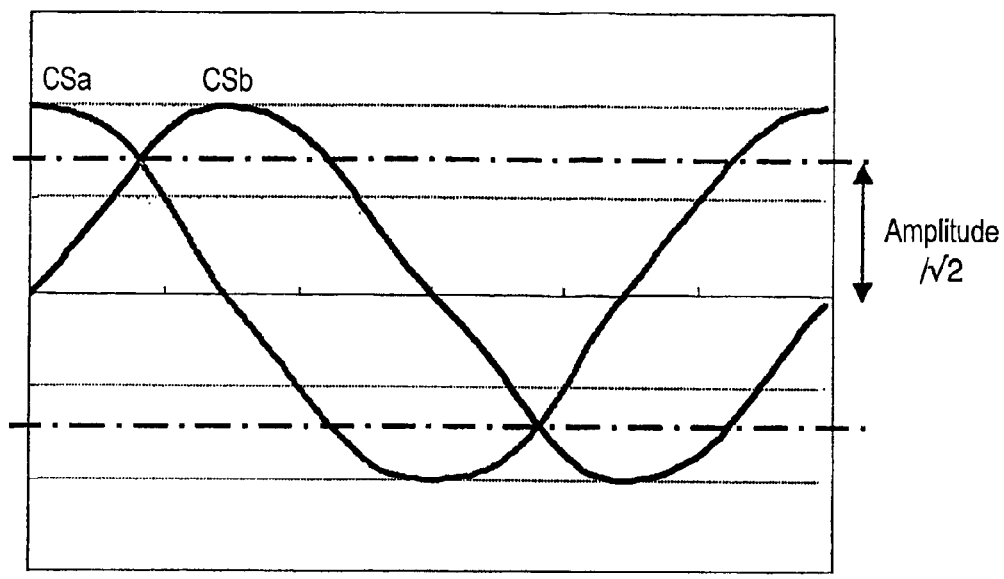
FIG. 14 shows an example of magnetic pole signals corrected by a magnetic-flux mapping device.

On the other hand, in the actual signals CSa and CSb, respective amplitudes change and the shift due to offsets or harmonic components are added in addition to phase shift. Respective magnetic-pole signals are divided by the square root of CSgain (sum of the squares of the two signals CSar and CSbr), so that signals CSa and CSb are corrected to have a constant amplitude as shown in FIG. 14. In other words, mapping device 500 finds the sum of squares of two-phase magnetic-pole signals, and divides the respective signals by the square root of this sum, thereby mapping the two-phase signals such that the sum of the squares of the two-phase signals stays constant. As a result, the distortions of the original signals are corrected. Amplitudes after the correction can be set at any value.

Figure 15:
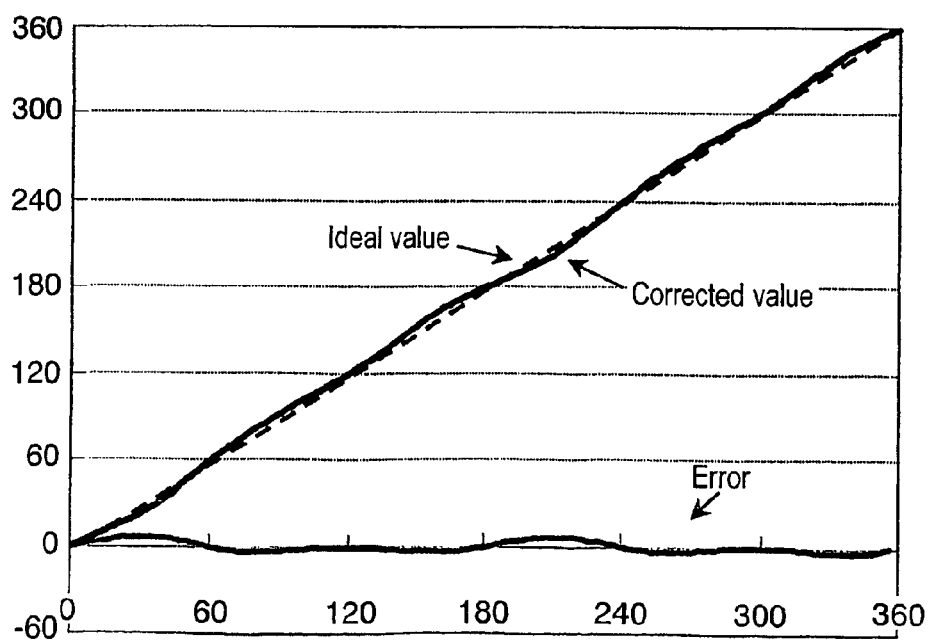
FIG. 15 shows an example of an error of positional information supplied from a position signal converter.

Based on signals CSa and CSb corrected by mapping device 500, position signal converter 402 finds a position of the motor through inverse trigonometric function computation, and outputs positional information. This is similar to the fourth embodiment. This computation is performed, as shown in FIG. 14, by switching the magnetic-pole signals at a threshold value that is a product of multiplying an amplitude by the square root of 0.5. The correction of the distortion by mapping device 500 assures monotonic increase of the detected positional values even at switching. The signals mapped by mapping device 500 in FIG. 14 are converted into positional information as shown in FIG. 15. As such, even if an original signal includes distortion, influence due to the distortion can be suppressed, so that positional information with a smaller error is obtainable. Based on the positional information supplied from position signal converter 402, sine-wave drive and speed control are provided to the motor using differentiator 108, speed controller 106 and PWM controller 104. This is similar to the first exemplary embodiment.

The foregoing structure allows the motor controller to suppress the influence of the shift when the controller detects any two magnetic-pole signals out of three-phase magnetic-pole signals shifted from ideal sine waves. Thus the controller can assure monotonic increase of the detected positional values. As a result, the motor can be driven with a sine wave from an initial turn-on. When a speed of the motor changes a lot, e.g., a transient response period, the motor can be kept driving with the sine wave without adding a position detector such as an encoder at an inexpensive cost and with ease. In this fifth embodiment, the magnetic-pole signal is divided by the square root of the sum of squares of the two-phase magnetic-pole signals; however, the square of the magnetic-pole signal can be divided by the sum of squares of the two-phase magnetic-pole signals.

Exemplary Embodiment 6

The embodiments discussed previously allow to detect a position of the motor within a cycle from a magnetic-pole signal to another magnetic-pole signal. However, a high speed spin of a motor sometimes does not provide a time span short enough to detect a magnetic-pole signal. In such a case, a position detection shifts by an integral multiple of a cycle of the magnetic-pole signal. A motor controller in accordance with the sixth embodiment allows a position detection even at a long time span for detecting a magnetic-pole signal.

Figure 16:
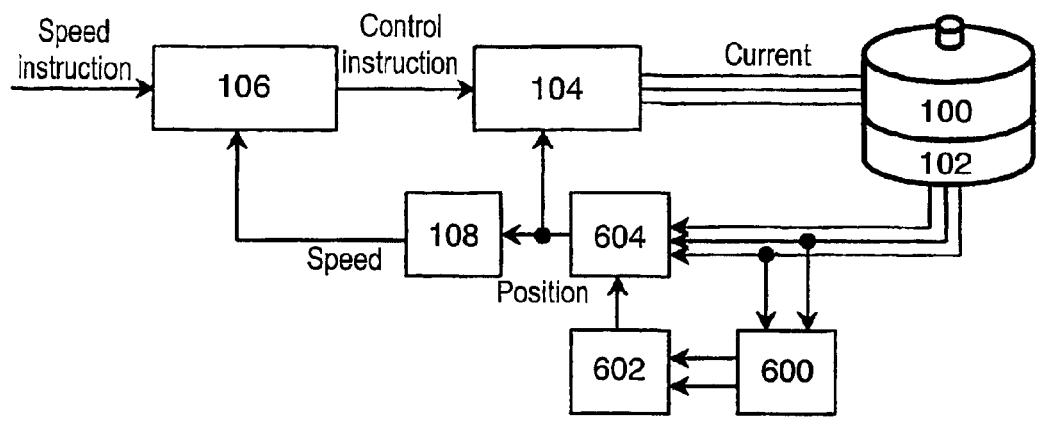
FIG. 16 shows a structure of a motor controller in accordance with a sixth exemplary embodiment of the present invention.
Figure 17:
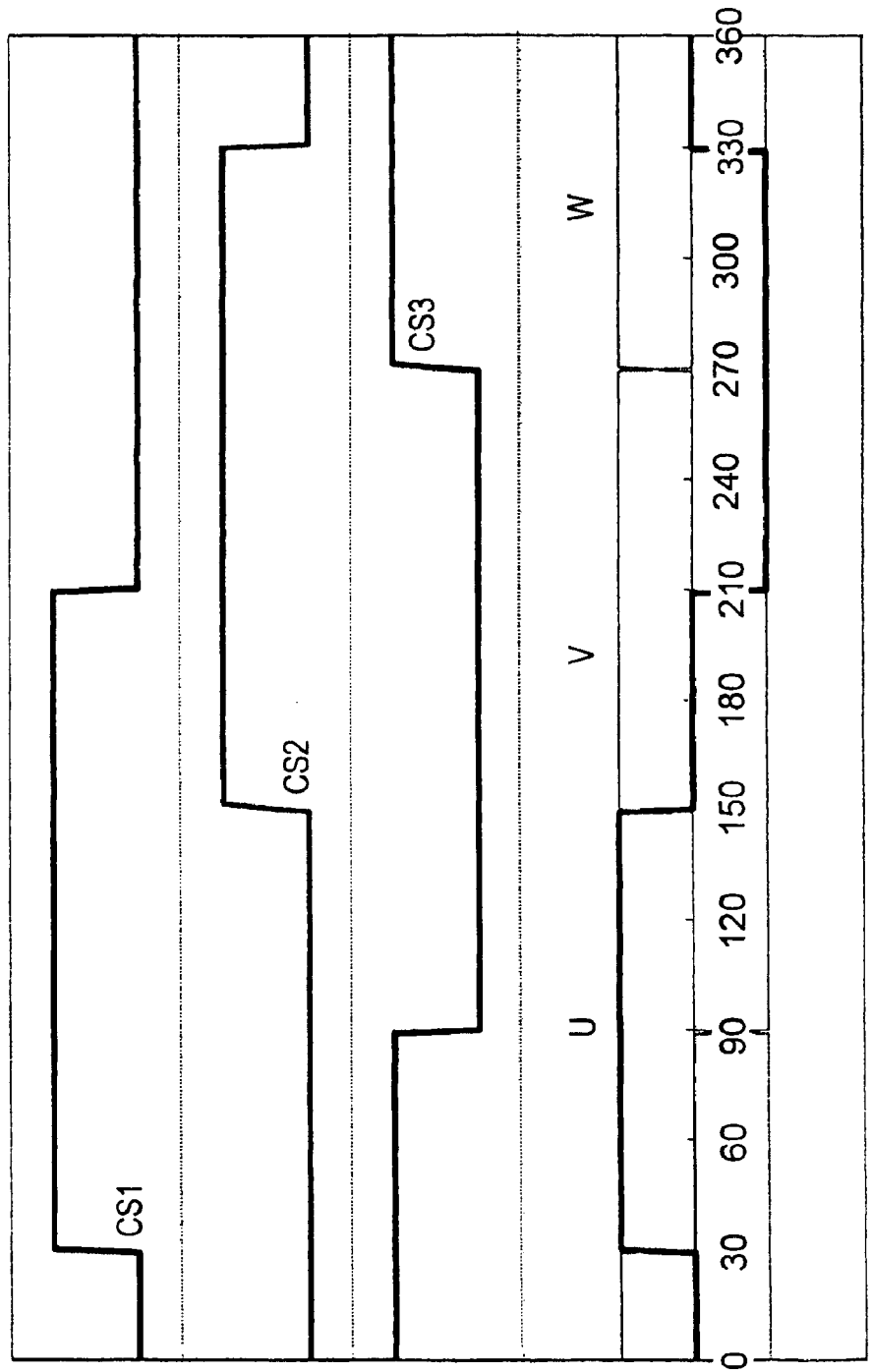
FIG. 17 shows a waveform of a magnetic pole position sensor and a rectangular wave drive of prior art.
Figure 18:
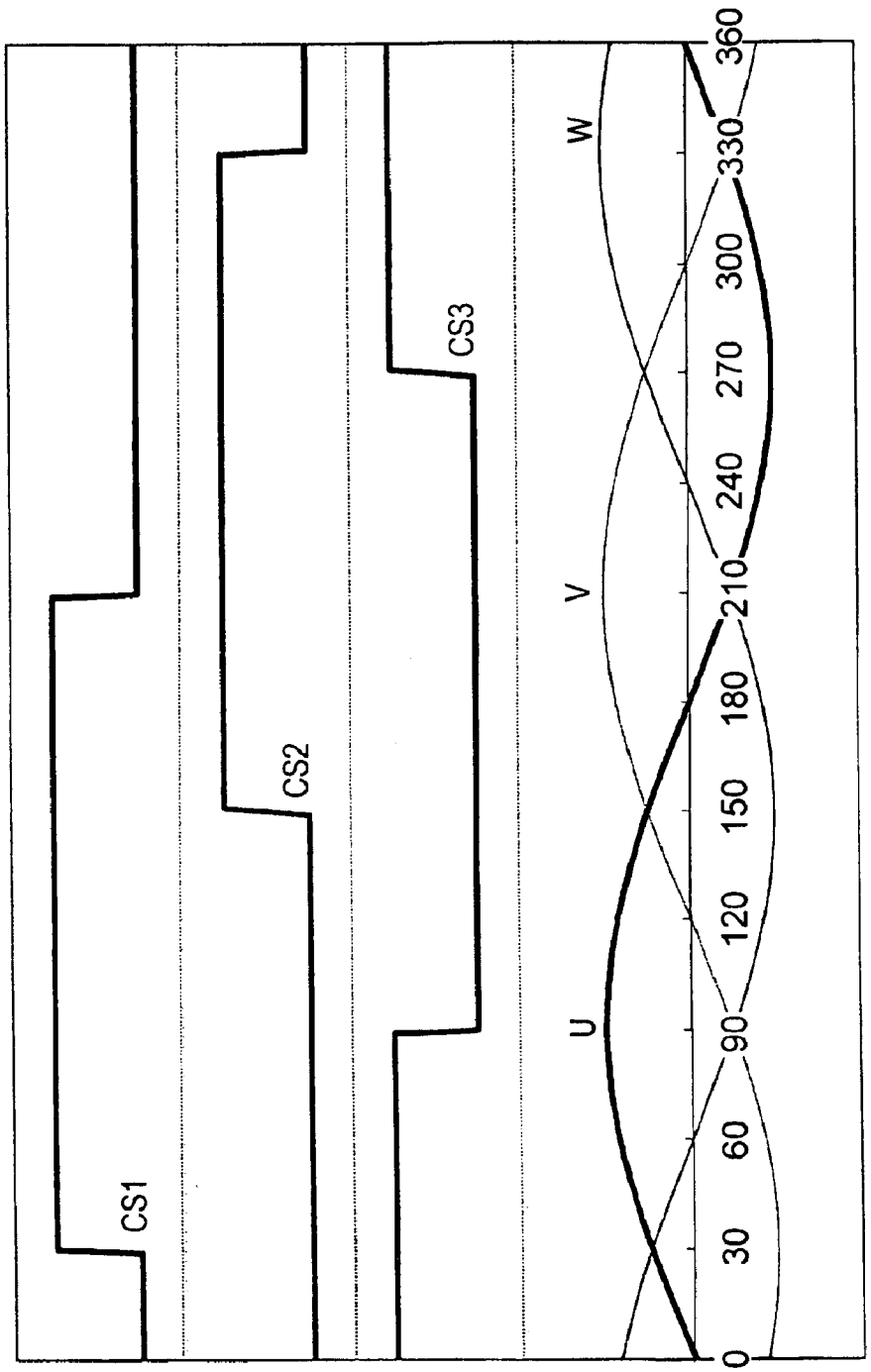
FIG. 18 shows a waveform of a magnetic pole position sensor and a sine wave drive of prior art.

FIG. 16 shows a structure of the motor controller in accordance with the sixth embodiment of the present invention. Motor 100 is equipped with magnetic-flux detector 102, which detects magnetic flux of motor's magnets and outputs three-phase sinusoidal wave magnetic-pole signals CS1, CS2 and CS3 having phase differences of approx. 120 degrees in between respectively.

Comparator 600 converts any two signals out of three-phase magnetic-pole signals CS1, CS2 and CS3 into rectangular waves. Counter 602, an up-down counter, receives the two rectangular waves, which comparator 600 outputs, and outputs values of four times multiplication of the cycles of magnetic-pole signals, namely, outputs four counts per a cycle. Position signal converter 604 finds a position signal of the motor using both of the motor position found through inverse trigonometric function computation provided to magnetic-pole signals CS1, CS2 and CS3 detected by a magnetic-flux detector 102 and the values counted by counter 602. Whenever the number of output-counters of counter 602 increases four, position signal converter 604 recognizes increase of one cycle, and outputs positional information. This method allows to detect a position signal free from the shift of position detection by an integral multiple of the cycle of the magnetic-pole signal, even if the motor spins at a high speed and a signal detection cycle by converter 604 is longer than a half cycle of the magnetic-pole signal.

Positional information from position signal converter 604 is converted to a motor speed by differentiator 108, and speed controller 106 outputs an instruction to PWM (pulse width modulation) controller 104 so that the motor speed can follow an instructed speed. Not only the speed control described here, but also position control or torque control is available.

The foregoing structure allows the motor controller to detect the motor position even when the motor spins at a high speed, which does not provide a time span small enough to detect the magnetic-pole signal.

Industrial Applicability

The motor controller of the present invention throws a synchronous motor always in sine wave drive even at starting or transition, thus the controller is suitable for driving calmly a synchronous motor with less vibrations.

Reference numerals in the drawings

| | |
|---|---|
| 100 | Motor |
| 102 | Magnetic-flux detector |
| 104 | PWM controller |
| 106 | Speed controller |
| 108 | Differentiator |
| 110, 402, 604 | Position signal converter |
| 200 | Neutral point corrector |
| 300, 500 | Magnetic-flux mapping device |
| 400 | Two-phase converter |
| 600 | Comparator |
| 602 | Counter |

What is claimed is:

1. A motor controller for driving a motor having a rotor, which includes magnet, said motor controller comprising:
   a) a magnetic flux detector for detecting a magnetic flux from said magnets and obtaining a magnet pole signal;
   b) a position signal converter for finding a position of the rotor based on the magnetic pole signal;
   c) a differentiator for finding a speed signal based on the output of the position signal converter;
   d) a speed controller for comparing the speed signal with a predetermined instructive speed, and outputting an instruction signal; and
   e) a PWM (pulse width modulation) controller for performing PWM drive of the motor according to the instruction signal,
   wherein the PWM controller drives the motor in sine wave forms, and
   wherein the magnetic pole signal is a two phase sine wave signal having a phase difference of 90°.

2. A motor controller for driving a motor having a rotor, which includes magnets, said motor controller comprising:
   a) a magnetic flux detector for detecting a magnetic flux from said magnets and obtaining a magnet pole signal;
   b) a position signal converter for finding a position of the rotor based on the magnetic pole signal;
   c) a differentiator for finding a speed signal based on the output of the position signal converter;
   d) a speed controller for comprising the speed signal with a predetermined instructive speed, and outputting an instruction signal; and
   e) a PWM (pulse width modulation) controller for performing PWM drive of the motor according to the instruction signal,
   wherein the PWM controller drives the motor in sine wave forms, and
   wherein the magnetic pole signal is a three phase sine wave signal having a phase difference of 120°, further comprising:
   a neutral point corrector for correcting the magnetic pole signal,
   wherein the magnetic pole signal is corrected by the neutral point corrector and input into the position signal converter.

3. The motor controller according to claim 2, wherein the neutral point corrector calculates an average value of a sum of the magnetic pole signal and subtracts the average value of the sum from the magnetic pole signal of each phase.

4. A motor controller for driving a motor having a rotor, which includes magnets, said motor controller comprising:
   a) a magnetic flux detector for detecting a magnetic flux from said magnets and obtaining a magnet pole signal;
   b) a position signal converter for finding a position of the rotor based on the magnetic pole signal;
   c) a differentiator for finding a speed signal based on the output of the position signal converter;
   d) a speed controller for comparing the speed signal with a predetermined instructive speed and outputting an instruction signal; and
   e) a PWM (pulse width modulation) controller for performing PWM drive of the motor according to the instruction signal,
   wherein the PWM controller drives the motor in sine wave forms, and wherein the magnetic pole signal is a three phase sine wave signal having a phase difference of 120°, further comprising:

a magnetic flux mapping device for correcting the magnetic pole signal, wherein the magnetic pole signal is corrected by the magnetic flux mapping device and input into the position signal converter.

5. The motor controller according to claim 4, wherein the magnetic flux mapping device divides each one of the magnetic pole signals by a square root of a sum of squares of the magnetic pole signals.

6. The motor controller according to claim 4, wherein the magnetic flux mapping device divides a square of each one of the magnetic pole signals by a sum of squares of the magnetic pole signals.

7. A motor controller for driving a motor having a rotor, which includes magnets, said motor controller comprising:
   a) a magnetic flux detector for detecting a magnetic flux from said magnets and obtaining a magnet pole signal;
   b) a position signal converter for finding a position of the rotor based on the magnetic pole signal;
   c) a differentiator for finding a weed signal based on the output of the position signal converter;
   d) a speed controller for comparing the speed signal with a predetermined instructive speed, and outputting an instruction signal; and
   e) a PWM (pulse width modulation) controller for performing PWM drive of the motor according to the instruction signal
   wherein the PWM controller drives the motor in sine wave forms, and
   wherein the magnetic pole signal is a three phase sine wave signal having a phase difference of 120°, further comprising:
   a neutral point corrector for correcting the magnetic pole signal and a magnetic flux mapping device for correcting a signal of the neutral point corrector in distortion,
   wherein the magnetic pole signal is corrected by the neutral point corrector and the magnetic flux mapping device, and input into the position signal converter.

8. The motor controller according to claim 7, wherein the position signal converter converts the magnetic pole signal by using a threshold not more than half of an amplitude of the magnetic pole signal which has been corrected.

9. A motor controller for driving a motor having a rotor, which includes magnets said motor controller comprising:
   a) a magnetic flux detector for detecting a magnetic flux from said magnets and obtaining a magnet pole signal;
   b) a position signal converter for finding a position of the rotor based on the magnetic pole signal;
   c) a differentiator for finding a speed signal based on the output of the position signal converter;
   d) a speed controller for comparing the speed signal with a predetermined instructive speed, and outputting an instruction signal; and
   e) a PWM (pulse width modulation) controller for performing PWM drive of the motor according to the instruction signal
   wherein the PWM controller drives the motor in sine wave forms, and
   wherein the magnetic pole signal is a three phase sine wave signal having a phase difference of 120°, further comprising:
   a two-phase converter,
   wherein the two-phase converter converts the three phase sine wave signal having the phase difference of 120° into a two phase sine wave signal having a phase difference of 90°.

10. The motor controller according to claim 9, wherein the two-phase converter converts into the two phase sine wave signal having the phase difference of 90°, by using a sum and a difference of the magnetic pole signals of arbitrary two phases of the three phase sine wave signal.

11. The motor controller according to claim 9, further comprising:
   a magnetic flux mapping device for correcting the magnetic pole signal,
   wherein the magnetic pole signal is corrected in distortion by the magnetic flux mapping device and input into the position signal converter.

12. The motor controller according to claim 11, wherein the magnetic flux mapping device divides each one of the magnetic pole signals by a square root of a sum of squares of the magnetic pole signals.

13. The motor controller according to claim 11, wherein the magnetic flux mapping device divides a square of each one of the magnetic pole signals by a sum of squares of the magnetic pole signals.

14. The motor controller according to claim 11, wherein the position signal converter converts the magnetic pole signal using a threshold which is obtained by multiplying a square root of 0.5 by an amplitude of the magnetic pole signal which has been corrected.

15. A motor controller for driving a motor having a rotor, which includes magnets, said motor controller comprising:
   a) a magnetic flux detector for detecting a magnetic flux from said magnets and obtaining a magnet pole signal;
   b) a position signal converter for finding a position of the rotor based on the magnetic pole signal;
   c) a differentiator for finding a speed signal based on the output of the position signal converter;
   d) a speed controller for comparing the speed signal with a predetermined instructive speed, and outputting an instruction signal; and
   e) a PWM (pulse width modulation) controller for performing PWM drive of the motor according to the instruction signal
   wherein the PWM controller drives the motor in sine wave forms, and
   wherein the magnetic pole signal is a three phase sine wave signal having a phase difference of 120°, further comprising;
   a comparator for converting the magnetic pole signal into a rectangular wave;
   a counter for outputting a multiple number of a cycle of the magnetic pole signal based on an output of the comparator,
   wherein the position signal converter finds positional information using logical sum of the magnetic pole signal and an output of the counter.

16. The motor controller according to claim 15, wherein the comparator inputs signals of arbitrary two phases of the magnetic pole signal, and the counter outputs a quadruple value of a cycle of the magnetic pole signal.

* * * * *

UNITED STATES PATENT AND TRADEMARK OFFICE
CERTIFICATE OF CORRECTION

PATENT NO. : 6,906,494 B2
DATED : June 14, 2005
INVENTOR(S) : Matsuura et al.

It is certified that error appears in the above-identified patent and that said Letters Patent is hereby corrected as shown below:

Column 10,
Line 29, delete "comprising" and insert -- comparing --.

Column 11,
Line 23, delete "weed" and insert -- speed --.

Column 12,
Line 46, after "signal" insert -- , --.
Line 51, delete ";" and insert -- : --.

Signed and Sealed this

Twenty-second Day of November, 2005

JON W. DUDAS
*Director of the United States Patent and Trademark Office*